Aug. 8, 1933. C. Z. CASE 1,921,560
FILM SPOOL FOR ROLL FILM CAMERAS
Filed Dec. 11, 1931
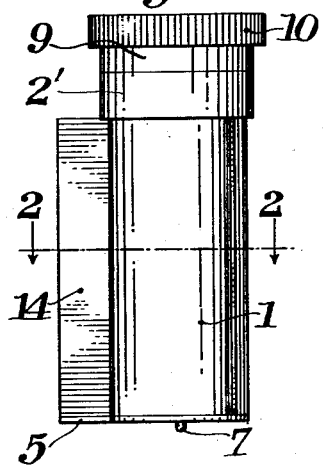
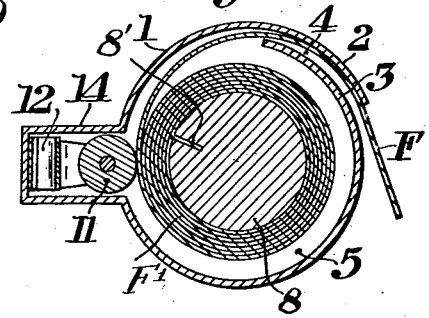
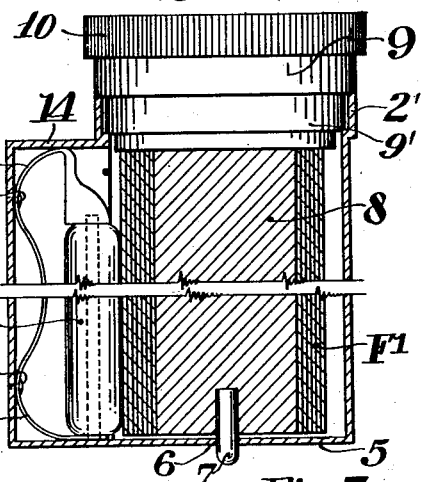
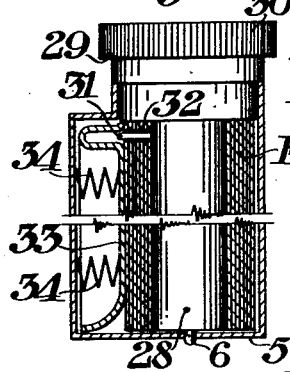
Charles Z. Case,
INVENTOR:
BY
ATTORNEYS.

Patented Aug. 8, 1933

1,921,560

UNITED STATES PATENT OFFICE

1,921,560

FILM SPOOL FOR ROLL FILM CAMERAS

Charles Z. Case, London, England, assignor to Eastman Kodak Company, Rochester, N. Y., a Corporation of New York Application December 11, 1931, Serial No. 580,474, and in Great Britain February 7, 1931

14 Claims. (Cl. 95—31)

This invention relates to photography and particularly to film spool assemblies or packages particularly intended for use with small size cameras.

One object of my invention is to provide a light tight film spool package with means for moving the film to and from the package. Another object of my invention is to provide a film spool package with a film impelling means and a light tight closure through which the film may be moved to and from an exposure frame in a camera. Another object of my invention is to provide a light tight film package in which the film is mounted on a hub member and against which a presser roll exerts a thrust permitting the hub member to be rotated to unroll film from the hub. Another object of my invention is to provide a light tight package which may be entered into a suitable camera, unrolled and exposed, and rerolled into the original package and removed from the camera and other objects will appear from the following specification, the novel features being particularly pointed out in the claims at the end thereof.

According to the present invention, a film spool off which the film is adapted to be wound for exposure by rotation of the spool in one direction and onto which the same film is adapted to be subsequently rewound, has permanently mounted thereon at one end means adapted to lie outside the spool chamber of the camera, whereby the spool can be directly rotated in either direction after insertion in the spool chamber.

Referring to the drawing, wherein like reference characters denote like parts throughout:

Fig. 1 is a side elevation of a film spool package constructed in accordance with and embodying a preferred form of my invention.

Fig. 2 is a cross-section on line 2—2 of Fig. 1 on a somewhat enlarged scale.

Fig. 3 is a longitudinal section through the device shown in Fig. 1, with parts being shown in elevation.

Fig. 4 is a view similar to Fig. 3 but showing a modification of the structure shown in Fig. 3.

Fig. 5 is a fragmentary plan view of a film which may be used with the modification shown in Fig. 4.

Fig. 6 is a plan view showing a camera which may receive the film package shown in the preceding figures and Fig. 7 is a showing of a light lock which may be used to render the connection between the film package and the camera light tight.

Referring to Fig. 1, the film package may comprise a substantially cylindrical housing 1 made of metal, cardboard, or other suitable material, in which the ends of the material forming the housing are made to overlap, one end 2, being spaced from the other end 3, as best shown in Fig. 2, so that there remains an arcuate-shaped opening 4 of sufficient width for a film F to pass therethrough. The top of the cylindrical container is provided with an annular flange 2', while the bottom of said container is closed by means of a plate 5 which is provided with an aperture 6, as shown in Fig. 3.

The photographic strip material or film is wound upon a hub 8, the inner end of the film being inserted into the slot 8' provided in the usual manner in hub 8. A trunnion 7 is set in one end of hub 8 and is adapted to fit into aperture 6 of plate 5. A handle composed of a plurality of stepped annular portions is attached to the other end of hub 8. An annular portion 9' of the handle fits into and may rotate within said annular flange 2' of the cylindrical container. A second annular portion 9 of the handle forms with annular portion 9' a shoulder which abuts the upper edge of annular flange 2', while a knurled portion 10 of the handle is still larger in diameter than annular portion 9 and provides a convenient grip for manually turning the handle.

The convolutions F' of film F, which are wound upon the hub 8, as best shown in Fig. 3, are held in intimate contact with each other and with the hub 8 by means of a roller 11, which may be carried by leaf spring 12 having pin and slot connections at 13 with an offset housing 14.

Thus the hub 8 and the spring pressed roller 11 may be considered wringer rollers between which the film is passed just prior to its entrance into the light tight arcuate passage-way 4. Obviously, with the film package just described, by turning the handle 10 the film F may be pushed through the passage-way 4 into a camera such as is shown in my co-pending application, Serial No. 580,473, filed on even date herewith, and such as is diagrammatically illustrated in Fig. 6.

An indicated in this figure, there are a pair of spaced channel members 15 which form a guideway for the film as it passes out of the passage-way 4 so that as the handle is turned the film may be propelled through the guideway 15 which holds the film in the focal plane of an objective mounted on the housing 16.

It should be noted that the film passes through the channel 15 into a substantially cylindrical chamber 17 in which the natural tendency of the film to curl causes it to coil in the chamber 17.

In operating the camera just described, the film may be either wound from the hub member 8 and exposed one at a time so that the exposed film will coil loosely in chamber 17 and, after the roll has been completely exposed, can be again wound on the hub 8 or the unexposed film can be wound through the camera into the chamber 17 so that in winding the film back upon the hub 8 the exposures can be made. In either case, the film is to be supplied in a container as above described, and, after exposure, is to be returned to this container in which it is sent to a processing station for development.

A light tight connection must be provided between the camera and the container or receptacle for the strip material or film. A satisfactory light sealing construction for the film receptacle is illustrated in Fig. 7 and comprises a pair of jaws 18 which are adapted to swing about a pin 19 on the camera wall 20 and which are adapted to encircle the annular flange 2' and annular portion 9. The under surfaces and inner edges of jaws 18 are covered with strips 18' of plush or other suitable light sealing material to prevent the leakage of light between the adjacent surfaces of the handle, film container, and camera wall.

In a second embodiment of my invention, as shown in Figure 4, there is a hub member 28 which may be operated by handle 29, knurled at 30, just as in the first embodiment of my invention. Hub 28, however, is provided with an outwardly extending pin 31 which is adapted to engage a series of apertures 32 in the film $F^2$, so that there is a power-driven connection between the film convolutions and the hub 28. In order to press the film so that the apertures engage the pin 31, a presser member 33 in the form of a rounded bar may be provided, springs 34 tending to thrust this resiliently against the film.

As best shown in Fig. 5, the spaces between the apertures 32 in the film $F^2$ must differ to such an extent that the gradually increasing diameter of the film convolutions from the hub 28 will be taken care of so that all of the apertures, when the film is wound up, will come opposite the pin 31. Thus the film may be provided with apertures 32 in which space B is slightly greater than A, C greater than B, D greater than C, and so on, according to the number of convolutions of film on the hub 28.

If it should be desirable, more than one pin 31 can be provided on the hub 28; thus a corresponding increase in the number of apertures will have to be made in the film.

It is obvious that with either form of my invention the film can be propelled in either direction into a camera, as diagrammatically illustrated in Figure 6.

Having now described my invention, what I claim as new and desire to be secured by Letters Patent is:

1. In a film magazine, the combination with a casing, and a hub member rotatably mounted in said casing and adapted to receive a coil of photographic strip material, of a presser means within said casing and resiliently maintained in engagement with the outer convolution of said strip material.

2. In a film magazine, the combination with a casing having an off-set housing, and a hub member rotatable within said casing and adapted to receive a coil of photographic strip material, of a presser means within the off-set housing of said casing and resiliently maintained in engagement with the outer convolution of said strip material.

3. In a film magazine, the combination with a casing having an off-set housing, and a hub member rotatable within said casing and adapted to receive a coil of photographic strip material, of a presser means within the off-set housing of said casing and resiliently maintained in frictional engagement with the outer convolution of said strip material.

4. In a film magazine, the combination with a casing having an off-set housing, and a hub member rotatable within said casing and adapted to receive a coil of photographic strip material, of a presser means including a resilient support within said off-set housing and a roller rotatably mounted in said resilient support and adapted to make rolling frictional engagement with the outer convolution of said strip material.

5. In a film magazine, the combination with a casing having an off-set housing, and a hub member rotatably mounted in said casing and adapted to receive a coil of photographic strip material, of a leaf spring in said off-set housing, pin and slot connections therebetween, and a roller rotatably supported by said leaf spring and adapted to make rolling frictional engagement with the outer convolution of said strip material.

6. In a film magazine, the combination with a casing having an off-set housing, and a hub member rotatable within said casing and adapted to receive a coil of photographic strip material, of a presser member movable with respect to said offset housing and adapted to make sliding frictional engagement with the outer convolution of said strip material.

7. In a film magazine, the combination with a casing having an off-set housing, a hub member rotatable within said casing and adapted to receive a coil of photographic strip material, and a radial projection on said hub member and adapted to engage perforations in said strip material which are spaced at progressively increasing intervals, of a presser member movable with respect to said off-set housing, provided with a recess adapted to receive said radial projection, and adapted to make frictional engagement with the outer convolution of said strip material.

8. In a film magazine, the combination with a casing having an off-set housing, a hub member rotatable within said casing and adapted to receive a coil of photographic strip material, and a radial projection on said hub member and adapted to engage perforations in successive convolutions of said strip material, of a presser member movable with respect to said off-set housing and provided with a recess adapted to receive said radial projection, and a resilient means between said housing and presser member to move the same into sliding frictional engagement with the outer convolution of said strip material.

9. A receptacle for photographic strip material provided with perforations at progressively increasing intervals comprising a hub member adapted to receive a coil of said photographic strip material, and a projection extending radially from said hub member and adapted to engage the perforations in successive convolutions of said strip material.

10. A receptacle for photographic strip material comprising a hub member adapted to receive a coil of photographic strip material which is provided with perforations in radial alignment when the film is coiled on said hub member, a projection extending radially from said hub member and adapted to engage said perforations in successive convolutions of said strip material and a handle axially affixed to said hub member.

11. In a film magazine, the combination with a hub member adapted to receive a coil of photographic strip material, and a casing adapted rotatably to support said hub member and provided with an opening through which said strip material can be conducted, of a presser means within said casing, in engagement with the outer convolution of said strip material and adapted to direct the end thereof to said opening.

12. In a film magazine, the combination with a hub member adapted to receive a coil of photographic strip material, and a casing adapted rotatably to support said hub member and having the edges of the casing spaced to form an opening through which said strip material can be conducted, of a presser means within said casing, in frictional engagement with the outer convolution of said strip material and adapted to direct the outer end of said strip material to said opening.

13. In a film magazine, the combination with a hub member adapted to receive a coil of photographic strip material, and a casing adapted rotatably to support said hub member and having overlapping edges of the casing spaced to form an opening through which said strip material can be conducted, of a roller within said casing, resiliently pressed against the outer convolution of said strip material, and adapted to direct the outer end of said strip material to said opening.

14. In a film magazine, the combination with a hub member adapted to receive a coil of photographic strip material, and a casing adapted rotatably to support said hub member and having overlapping edges of the casing spaced to form an arcuate conduit through which said strip material can be conducted, of a presser plate within said casing, resiliently pressed into sliding frictional engagement with the outer convolution of said strip material, and adapted to direct the outer end of said strip material to said arcuate conduit.

CHARLES Z. CASE.